United States Patent [19]

Krippelz, Sr.

[11] Patent Number: 5,017,903

[45] Date of Patent: May 21, 1991

[54] EMERGENCY LIGHT

[76] Inventor: Jacob Krippelz, Sr., 1121 Lebanon St., Aurora, Ill. 60505

[21] Appl. No.: 312,830

[22] Filed: Feb. 21, 1989

[51] Int. Cl.$^5$ ............................................. B60Q 1/52
[52] U.S. Cl. ..................................... 340/472; 340/468; 362/80; 362/83; 362/83.1; 362/83.3; 362/80.1
[58] Field of Search ............... 340/472, 468; 362/83.1, 362/83.3, 80.1, 80, 61, 81, 82, 362, 83; 307/9.1, 10.8

[56] References Cited

U.S. PATENT DOCUMENTS

| | | | |
|---|---|---|---|
| 1,096,452 | 5/1914 | Perrin | 362/81 |
| 1,415,465 | 5/1922 | Nigh | 362/83.1 |
| 1,458,703 | 6/1923 | Harris et al. | 362/83.1 |
| 2,010,138 | 8/1935 | Condon | 362/83.1 |
| 2,010,374 | 8/1935 | Pissis | 362/81 |
| 2,180,610 | 11/1939 | Ritz-Woller | 362/83.1 |
| 2,457,348 | 12/1948 | Chambers | 362/83.1 |
| 2,595,331 | 5/1952 | Calihan et al. | 362/83.1 |
| 3,273,118 | 9/1966 | Hendershot | 362/83.3 |
| 4,375,634 | 3/1983 | Leis | 340/472 |

FOREIGN PATENT DOCUMENTS 0191246  8/1987  Japan ................................. 362/83.1

*Primary Examiner*—Donnie L. Crosland

[57] ABSTRACT

A warning light is contained in the housing of a rear view mirror assembly mounted to the side of a vehicle and directs a conical beam of light toward the pavement at the side of the vehicle.

8 Claims, 1 Drawing Sheet

EMERGENCY LIGHT

The present invention relates in general to warning lights for automotive vehicles for use in adverse weather conditions such as fog, snow and heavy rain. More particularly, the invention relates to a new and improved warning light which is visible from a substantial distance but does not interfere with the vision of the driver of the vehicle itself or of the drivers of other vehicles approaching it.

BACKGROUND OF THE INVENTION

Rear end collisions during heavy rain, fog and snow are not uncommon, and they usually occur because the leading vehicle is not visible to the driver of the vehicle approaching from the rear. Red tail lights do not radiate light waves of sufficient intensity and proper wavelength to adequately penetrate the atmosphere. While tail lights of different color or of greater intensity would be more visible they could be confused with front mounted vehicle lights and thus cause accidents of a different type.

SUMMARY OF THE INVENTION

Briefly, there is provided in accordance with the present invention a new and improved warning light which is mounted at an elevated position on the driver's side of an automotive vehicle and which projects a beam of white light down onto the pavement adjacent to the vehicle. When the air is clear, i.e., it does not contain vapor or a substantial number of foreign particulates such as dust, water drops, vapor or snow, the beam is almost invisible, but when vapor or particulates are present the reflections from the particulates and/or vapor are clearly visible from both the front and rear of the vehicle.

It is important that the light beam not impinge on the vehicle itself, and therefor, the light source must be spaced outwardly from the side of the vehicle where it is mounted. However, for safety reasons it is preferred that the light source not be affixed to the vehicle as another accessory. In a preferred embodiment of the invention, therefor, the warning light is housed within a conventional rearview mirror assembly which is mounted to the driver's side of the vehicle below the side window. When so positioned, the light beam is not distracting to the driver but is clearly visible from the front and side of the vehicle. Where desired, a second light source may be mounted to a rearview mirror on the passenger side of the vehicle.

Although different types of light sources may be used, I have found that stroboscopic white light is particularly good. Also, a flashing spot light may be used as the light source since it is clearly visible from a sufficient distance behind the vehicle to make rear end collisions less likely.

GENERAL DESCRIPTION OF THE DRAWING

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 1:
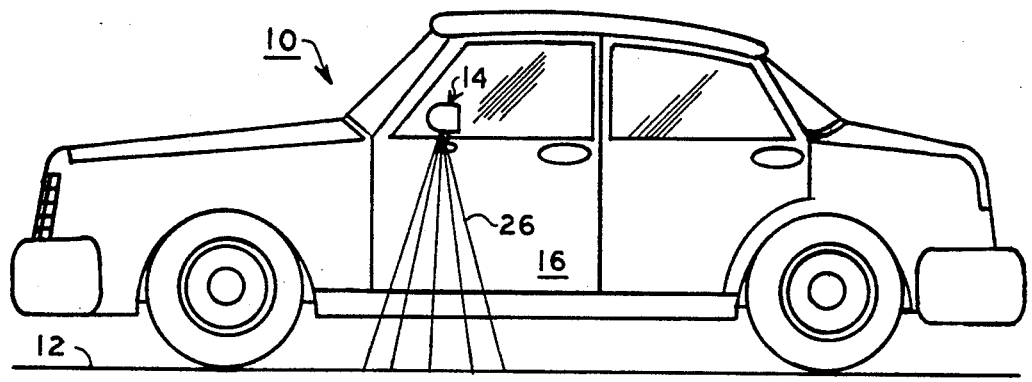
FIG. 1 is a side view of an automotive vehicle on which an emergency warning light embodying the present invention is mounted.
Figure 2:
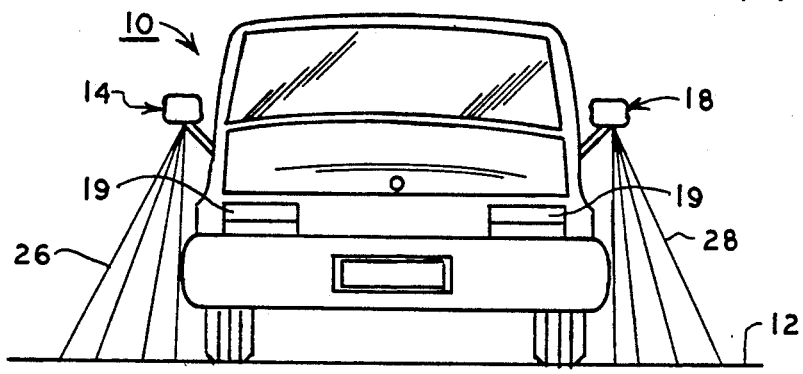
FIG. 2 is a rear view of the vehicle of FIG. 1.
Figure 3:
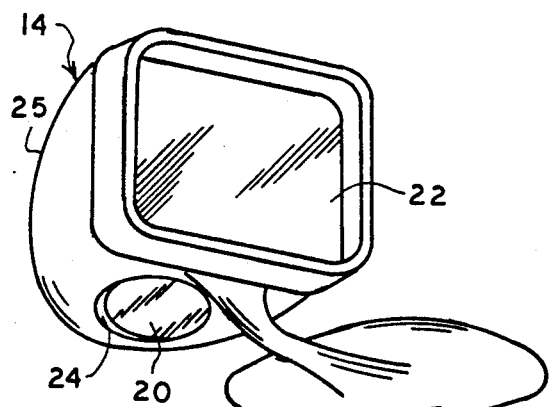
FIG. 3 is a perspective view of a rearview mirror incorporating an emergency warning light of the present invention.

Referring to the drawings and particularly to FIGS. 1 and 2 thereof, there is shown an automotive vehicle 10 located on a ground surface such as pavement 12 and including a rearview mirror assembly 14 mounted to a door 16 on the driver's side of the vehicle 10 and a second rear view mirror assembly 18 similarly mounted on the passenger side of the vehicle. The mirror assemblies are located in proximity to the bottoms of the respectively adjacent windows. The vehicle 10 is conventional and thus includes a pair of tail lights 19.

Figure 4:
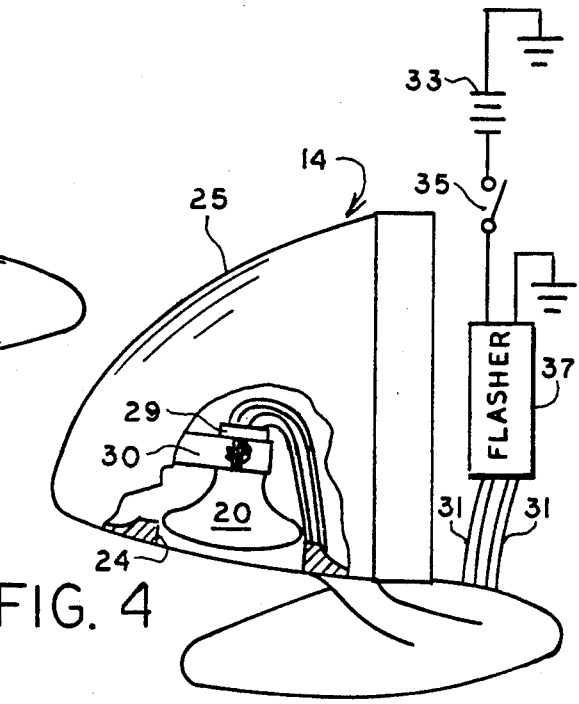
FIG. 4 is a side view, partially broken away, of the rear view mirror of FIG. 3.

As best shown in FIG. 4, a source of light in the form of a light bulb 20 is mounted in the rearview mirror assembly 14 directly behind a mirror 22 which faces towards the rear of the vehicle. A circular opening 24 is provided in the bottom of the housing 25, and the light source 20, which is suitably mounted in the housing 25 for access through the opening 24, directs a conical beam of light onto the pavement 12 immediately adjacent to the vehicle 10. A light source identical to the source 20 is similarly mounted in the rearview mirror assembly 18 on the passenger side of the vehicle, and it also directs a conical beam of light 28 onto the pavement 12 adjacent to the passenger side of the vehicle. The beams 26 and 28 have an included angle of approximately thirty degrees, and consequently, they do not shine into the car 10 nor do they radiate any light which shines directly toward any approaching vehicles.

The light source 20 is suitably mounted within the housing 27 by a mounting bracket 30 in a receptacle 29 which is supported by the bracket 30 and is connected by a pair of conductive leads 31 across the battery 33 of the vehicle via a series connected, manual switch 35. If desired, a conventional flasher 37 may be connected in the circuit between the leads 31 and the battery 23 so as to cause the light beams to flash on and off to make it more readily apparent to the drivers of approaching vehicles that it is a warning and should be approached with caution. It is believed that a sequence of twenty seconds on and twenty seconds off provides a good indication that the light is in the nature of a warning. If desired, the light source 20 may be connected in parallel with the output of the conventional emergency flasher in the associated vehicle so as to flash in synchronism with the rear tail lights.

While the light source 20 is illustrated as being a conventional spot light type of lamp bulb, other sources of light such as stroboscopic light may be used. In the latter case there is no need for a flasher inasmuch as the stroboscopic light system in itself provides a recognizable warning of danger.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. An emergency warning light for an automotive vehcile having a window on one side thereof, comprising in combination light source means for producing a beam of flashing light, means mounting said light source means to said one side of said vehicle in spaced relationship with said one side in proximity to said window for causing said beam to be directed downwardly from a location along said one side of said vehicle, said beam of flashing light being generally conical and passing along said one side of said vehicle without directly impinging on said vehicle, and said beam of flashing light being visible from in front of and from behind said vehicle.

2. An emergency warning light for an automotive vehicle having a window on one side thereof, comprising in combination a housing mounted in a fixed, substantially unadjustable position on said vehicle adjacent to said window, said housing having an opening in the bottom thereof, a source of light mounted within said housing for directing a conical beam of light downwardly through said opening along said side of said vehicle below said window so as to be visible from in front of and from behind said vehicle, and said opening and said source of light being positioned to prevent said beam of light from directly impinging on said side of said vehicle.

3. An emergency warning light according to claim 2, wherein said source of light produces a flashing beam of light.

4. An emergency warning light according to claim 3, wherein said beam of light is stroboscopic 5. An emergency warning light according to claim 2 wherein said flashing light rays are stroboscopic.

6. An emergency warning light according to claim 2 wherein said beam has an interior angle of approximately thirty degrees.

7. An emergency warning light according to claim 6 and further comprising a side view mirror assembly including a housing mounted to said vehicle adjacent to and below said window, said housing having an opening in the bottom thereof, said source of flashing light rays being fixedly mounted in said mirror assembly for directing said beam of light through said opening to prevent the emission of said light rays in other than a downward direction.

8. A method of providing a visible warning of the presence of a vehicle, comprising the steps of:

mounting to said vehicle an emergency warning light as set forth in claim 2, and energizing said radiant energy source means when said vehicle is in fog.

* * * * *

(12) REEXAMINATION CERTIFICATE (4625th)
United States Patent
Krippelz, Sr.

(10) Number: US 5,017,903 C1
(45) Certificate Issued: Aug. 13, 2002

(54) EMERGENCY LIGHT

(75) Inventor: Jacob Krippelz, Sr., 1121 Lebanon St., Aurora, IL (US) 60505

(73) Assignee: Jacob Krippelz, Sr., Aurora, IL (US)

Reexamination Request:
No. 90/005,468, Aug. 30, 1999

Reexamination Certificate for:
Patent No.: 5,017,903
Issued: May 21, 1991
Appl. No.: 07/312,830
Filed: Feb. 21, 1989

(51) Int. Cl.$^7$ .................................................. C60Q 1/52
(52) U.S. Cl. .................. 340/472; 340/468; 362/494; 362/542
(58) Field of Search ................................ 340/472, 468, 340/494; 362/487, 503, 504; 307/9.1, 10.8

(56) References Cited

U.S. PATENT DOCUMENTS

| | | | |
|---|---|---|---|
| 1,096,452 A | * 5/1914 | Perrin | 362/81 |
| 1,415,465 A | * 5/1922 | Nigh | 362/83.1 |
| 1,458,703 A | * 6/1923 | Harris et al. | 362/83.1 |
| 1,922,309 A | 8/1933 | Lillard | 40/560 |
| 2,010,138 A | * 8/1935 | Condon | 362/83.1 |
| 2,010,374 A | * 8/1935 | Pissis | 362/81 |
| 2,023,845 A | 12/1935 | LaRose | 40/556 |
| 2,180,610 A | * 11/1939 | Ritz-Woller | 362/83.1 |
| 2,276,104 A | 3/1942 | Shaunessey | 353/13 |
| 2,457,348 A | * 12/1948 | Chambers | 362/83.1 |
| 2,595,331 A | * 5/1952 | Calihan et al. | 362/83.1 |
| 2,635,681 A | 4/1953 | Hiltman et al. | 362/131 |
| 3,273,118 A | * 9/1966 | Hendershot | 362/83.3 |
| 3,334,816 A | 8/1967 | Mizuno | 239/18 |
| 4,375,634 A | * 3/1983 | Leis | 340/472 |

FOREIGN PATENT DOCUMENTS

| | | | |
|---|---|---|---|
| DE | 3635471 A1 | 4/1988 | |
| JP | 62-102739 | 12/1985 | |
| JP | 0191246 | * 8/1987 | 362/83.1 |
| KR | 4543 | 7/1986 | |
| WO | WO 81/02871 | 10/1981 | |

* cited by examiner

*Primary Examiner*—Donnie L. Crosland

(57) ABSTRACT

A warning light is contained in the housing of a rear view mirror assembly mounted to the side of a vehicle and directs a conical beam of light toward the pavement at the side of the vehicle.

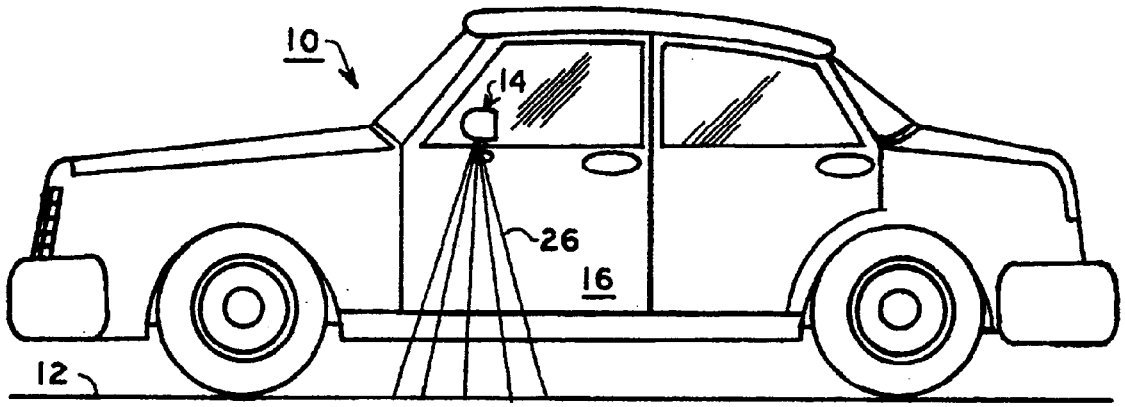

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

New claims 9–31 are added and determined to be patentable.

*9. The light of claim 2 wherein the housing is a side view mirror housing mounted to the vehicle adjacent said window, the source of light being fixedly mounted in said side view mirror housing for directing said beam of light through the opening and to prevent the emission of the beam of light in other than a generally downward direction.*

*10. The light of claim 2 wherein the housing has an enclosed bottom and the opening is located in only a portion of the enclosed bottom.*

*11. The light of claim 2 wherein the opening in the housing is circular.*

*12. The light of claim 9 wherein the side view mirror housing has an enclosed bottom and the opening is located in only a portion of the enclosed bottom.*

*13. The light of claim 10 wherein the enclosed bottom is generally flat.*

*14. The light of claim 13 wherein the enclosed bottom is substantially in a horizontal position when mounted on the vehicle and in position for use as a side view mirror.*

*15. The light of claim 9 wherein the beam has an interior angle of about thirty degrees.*

*16. The light of claim 2 wherein when the vehicle is on a flat surface, the light source directs a conical beam of light on the surface immediately adjacent the vehicle.*

*17. The light of claim 9 wherein when the vehicle is on a flat surface, the light source directs a conical beam of light on the surface immediately adjacent the vehicle.*

*18. The light of claim 9 wherein the source of light is mounted and fully contained within the housing.*

*19. The light of claim 10 wherein the source of light is mounted and fully contained within the side view mirror housing.*

*20. An emergency warning light for an automotive vehicle having a window on one side thereof, comprising in combination:*

*a housing mounted in a fixed, substantially unadjustable position on said vehicle adjacent to said window;*

*said housing having an opening in the bottom thereof;*

*a source of light mounted and completely contained within said housing for directing a conical beam of light downwardly through said opening along said side of said vehicle below said window so as to be visible from in front of and from behind said vehicle; and*

*said opening and said source of light being positioned to prevent said beam of light from directly impinging on said side of said vehicle.*

*21. The light of claim 20 wherein said housing is part of a side view mirror assembly having said opening in the bottom of said side view mirror assembly.*

*22. The light of claim 20 wherein the housing is a side view mirror housing mounted to the vehicle adjacent said window, the source of light being fixedly mounted in said side view mirror housing for directing said beam of light through the opening and to prevent the emission of light in other than a generally downward direction.*

*23. The light of claim 20 wherein the housing is a side view mirror housing mounted to the vehicle adjacent said window, the source of light being fixedly mounted in said side view mirror housing for directing said beam of light through the opening and to prevent the emission of the beam of light in other than a generally downward direction.*

*24. The light of claim 23 wherein the light source is mounted within the housing to prevent the emission of the beam of light in other than a downward direction.*

*25. The light of claim 20 wherein the side view mirror housing has an enclosed bottom and the opening is located in only a portion of the enclosed bottom.*

*26. The light of claim 25 wherein the opening in the housing is circular.*

*27. The light of claim 25 wherein the enclosed bottom is generally flat.*

*28. The light of claim 27 wherein the enclosed bottom is substantially in a horizontal position when mounted on the vehicle and in position for use as a side view mirror.*

*29. A method of providing a visible warning of the presence of a vehicle, comprising the steps of:*

*mounting to the vehicle a light as set forth in claim 2; and*

*energizing the source of light when the vehicle is in fog.*

*30. The method of claim 29 wherein the light source is fully contained within the housing.*

*31. The method of claim 29 wherein the housing is part of a side view mirror assembly mounted to the vehicle adjacent the window for directing the beam of light through the opening and to prevent the emission of the beam of light other than in a generally downward direction.*

\* \* \* \* \*